April 8, 1941.　　　　E. V. HAFFLING　　　　2,237,905

MACHINE TOOL

Filed July 25, 1939

INVENTOR
ERIC. V. HAFFLING
BY John A Hanrahan
ATTORNEY

Patented Apr. 8, 1941

2,237,905

UNITED STATES PATENT OFFICE 2,237,905

MACHINE TOOL

Eric V. Haffling, Stratford, Conn.

Application July 25, 1939, Serial No. 286,423

6 Claims. (Cl. 10—135)

This invention relates to new and useful improvements in machine tools and has particular relation to a small machine adapted or readily adaptable for drilling, tapping, the driving of screws, and the like.

The objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

Figures 1, 2:
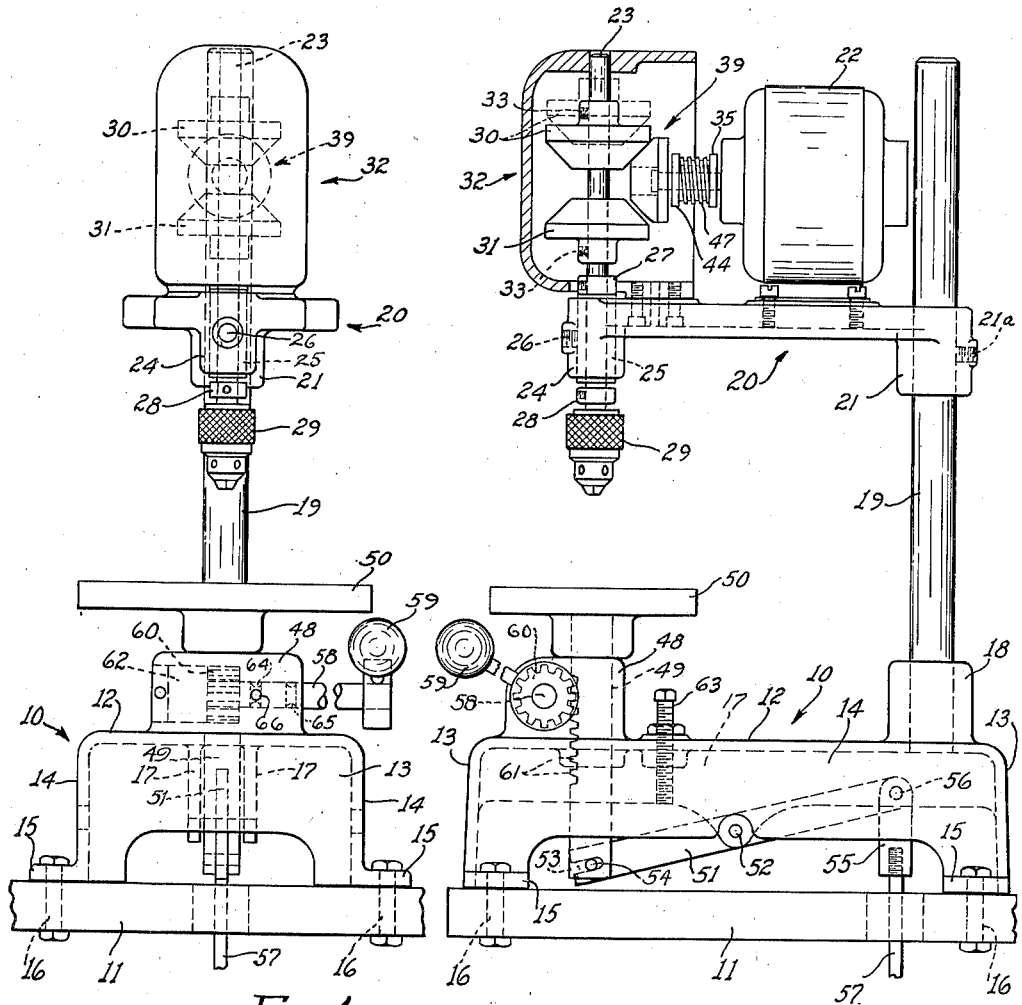
Fig. 1 is a front elevational view of the machine of the invention.
Fig. 2 is a side view of the machine portions being broken away.

Referring in detail to the drawing the present machine includes a base generally designated 10 and adapted to be disposed on a bench or the like a part of which is indicated at 11. Base 10 includes a top wall 12, end walls 13, and side walls 14 from the lower edges of which lugs 15 extend for the passage of securing means 16 whereby the base is secured to the bench or the like 11. Depending from the top wall 12 of the base and extending longitudinally of the latter are a pair of webs 17 arranged in parallel relation and the purpose of which will later be set forth.

A tubular projection 18 on the top wall 12 receives the lower end of an upright 19 on which is mounted a shelf-like support 20. Said support includes a portion 21 through which the upright 19 passes and a set screw or similar means 21a is provided for securing the support to the upright in the desired position of vertical adjustment above the base 10. Mounted on the support 20 is an electric motor 22 and forwardly of the motor a vertical spindle 23 passes through the support.

Support 20 is provided with a bearing portion 24 for the mounting of the spindle and a bearing sleeve 25 may be located within said bearing and secured in position by a set screw or the like 26. Fast on the spindle are collars 27 and 28 located at the upper and lower ends respectively of the bearing 24 and serving to allow a certain movement of the spindle through the bearing but positively limiting such movement as determined by the set positions of the collars. On the lower end of the spindle is a tool holder or chuck 29 adapted to receive a particular tool depending on the work to be performed.

Secured to the spindle at the upper side of the support 20 are a pair of oppositely disposed cones or friction gears 30 and 31 respectively. Also on the upper side of the support and providing a covering for such gears is a casing or housing 32 closed on all but its rear or inner side, such side being open for a purpose which will appear. Attention is directed to the fact that the casing 32 encloses the upper end of the spindle 23 and that such upper end is located an appreciable distance above the gear 30. The latter as well as gear 31 is secured to the spindle by a set screw 33 whereby the gears may be adjusted lengthwise of the spindle and relative to one another when occasion arises as will appear.

Figure 3:
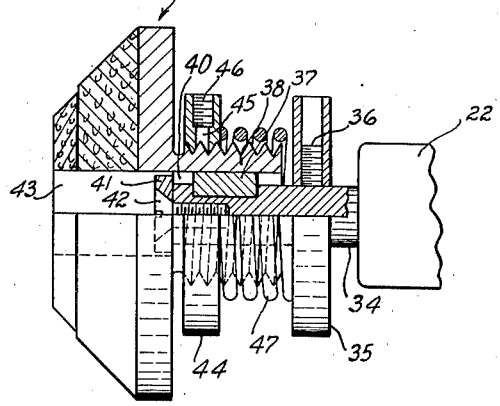
Fig. 3 is an enlarged view partly in elevation and partly in section and showing a slip or friction clutch employed.

Motor 22 includes a shaft 34 on which is fixed a collar 35 the same being secured by a set screw 36 (see Fig. 3). Also said shaft carries a key 37 and receives an externally threaded tubular extension 38 of a cone or friction gear 39. Extension 38 is provided internally with a key-way 40 receiving the key 37 whereby the extension and the gear 39 will be rotated with the motor shaft 34 but may have movement relative to the shaft in the direction of the length thereof. To prevent movement of the gear 39 off the forward end of the motor shaft a disc 41 is secured to the shaft as by means of a screw 42, the said disc being located in an opening 43 in the gear and which opening as well as the disc is somewhat larger in diameter than the internal diameter of the extension 38.

Threaded on the extension 38 is a collar 44 adapted to be adjusted along the said extension and then secured in position thereon. For the purpose of securing the said collar in the desired position of adjustment the same is provided with a radial opening in which is located a brass plug 45 adapted to be clamped against the threads of the extension as by means of a set screw or the like 46. Arranged about the extension 38 and the shaft 34 is a coil spring 47 bearing at its respective ends against the collars 35 and 44.

Obviously the tendency of the spring 47 is to urge the extension 38 and the gear 39 outwardly along the shaft 34 to shift the gear in the direction of the gears 30 and 31. By adjusting the collar 44 along the extension 38 the pressure with which the gear 39 will be held against one of the gears 30 and 31 is determined and it will be clear that when the collar 44 is so adjusted that the coils of the spring are against one another there is a solid arrangement and the gear 39 may not yield inwardly on the shaft 34. The function of the described friction or slip clutch will later be set forth in detail.

Through a raised housing 48 on the forward portion of the top wall 12 of the base passes a rack bar 49 depending from the under side of a work supporting platform 50 located in alignment with but below the spindle 23. A link 51 located under the base is pivoted intermediate its ends as on a pin 52 supported by the webs 17. The forward end of such link is slotted as at 53 and such slot straddles a pin 54 received by the lower bifurcated end portions of the rack bar 49. Thus the forward end of the link is pivotally connected with the lower end of the rack bar. A connector 55 is pivotally attached to the rear end of the link at 56 and secured to said connector is a rod 57 which, passing through the bench 11, may have a treadle connected thereto. It will be apparent that on downward movement of the rod 57 the link 51 will be rocked on the pivot pin 52 and the forward end of the link raised to raise the platform 50 toward the lower end of the spindle 23.

Also mounted by the housing 48 is a shaft 58 extending into the housing and at the outer side thereof having a hand lever 59 secured thereto. On the inner end of such shaft is secured a gear 60 the teeth of which are adapted to mesh with the teeth 61 on the rack bar. Shaft 58 is shiftable in the direction of its length whereby to shift the gear 60 from a position meshing with the teeth 61 to a position inwardly of the rack bar and out of mesh with the teeth thereof, as to a position within the space 62 shown in Fig. 1. When the gear is in mesh with the teeth 61 it will be clear that by imparting a turning movement to the shaft 58, through manipulation of the hand lever 59, the platform 50 may be raised and lowered. The lever is manually moved to raise the platform toward the tool holder 29 and then on release of the lever the platform and associated parts will gravitate to normal positions. Alternatively the lever may be manually returned to control the return movement of the platform.

When the gear 60 is out of mesh with the teeth of the rack bar the platform may be raised and lowered by manipulation of the rod 57. Also by shifting the gear out of mesh with the teeth of the rack bar the shaft 58 may be given a part turn and then moved to bring the gear back into mesh with the teeth 61 but with the lever 59 in a different position relative to the front of the machine. From the above it will be clear that the platform 50 may be operated either by hand using the lever 59 or the gear 60 may be shifted out of mesh with the rack teeth 61 and the platform operated by a treadle or the like through the rod 57.

Provided the machine is to be used for tapping the gears 30 and 31 are adjusted to the relation shown by the full lines in Fig. 2. There it will be noted that the spindle 23 being in a normal position the gear 30 is in contact with the gear 39 and the spindle will be rotating in a direction to thread a tap or the like out of an opening. Now a tapping tool being mounted in the holder 29 and the work being positioned on the platform 50 the latter is raised (either by manipulation of the lever 59 or the rod 57) and as the work engages the tool the spindle 23 is raised carrying the gear 30 away from the gear 39 and moving the gear 31 into engagement with such gear 39 whereby the spindle and the tool in holder 29 will be rotated in a direction to have the tool tap the work.

The tapping being accomplished the platform is lowered or moved downwardly from the spindle and as this is done the gear 31 is moved away from gear 39 and gear 30 brought into engagement with the latter. In this way the direction of rotation of the tool is reversed and the tool will be threaded out of the work. Collars 28 and 27 limit the up and down movement of the spindle 23. It will be understood that the adjustment of the collar 44 on the threaded gear extension 38 determines the tension of the spring 47 and thus the pressure at which the gear 39 will compress said spring and move in a direction away from the gear 31. While gear 39 will not move out of engagement with gear 31 when the resistance to turning movement of gear 31 reaches a predetermined point, as determined by the setting of collar 44, on the spring 47, the gear 39 will move rearwardly on shaft 34 and ease its engagement with gear 31 and thus stop the drive of the spindle when pressure against a tool exceeds that for which the spring is set.

Thus the collar 44 being properly adjusted drills, taps, and the like will not be broken by the operator forcing the work against the tool in the holder 29. The spring may be adjusted to hold the gear 39 in engagement with gear 31 under most any desired pressure and in fact a positive drive may be provided by adjusting the collar to close the coils of the spring against one another as above suggested. A screw 63 threaded through the top wall 12 of the base is arranged or located to be engaged by the link 51 as the platform is raised and thus to positively limit movement of the platform whenever the same is manipulated either by the lever 59 or through the rod 57.

When the machine is to be used for the driving of screws the gear 30 is released from the position shown in full lines in Fig. 2 and shifted to the dotted line position of said figure, being secured in either position by the screw 33. Access for this adjustment is gained through the open rear side of the casing 32. Such adjustment is made since in the driving of screws but one direction of rotation of the tool is necessary. A screw driver bit being mounted in the chuck 29 and the gear 30 being secured in the dotted line position as set forth the machine may be used to drive screws.

Under such circumstances the tool and the spindle 23 will be stationary when a screw is not being driven whereby to facilitate aligning the bit with the slot in the head of the screw. However, when the platform 50 is raised and carries the screw against a bit in the holder 29 the spindle will be elevated and gear 31 carried into contact with the gear 39 whereby the spindle 23 and thus the tool will be rotated by the motor 22. Thus the screw will be driven. Depending on the adjustment of the collar 44 the screw will be driven tightly home or only partly so as may be desired. Obviously the set screw 63 will in any instance prevent over throw of the platform and thus of the work.

Shaft 58 is provided with a pair of spaced annular grooves 64 and 65 and the housing 48 mounts a spring pressed ball device 66 for cooperation with such grooves. The grooves are so located that when the ball is in groove 64 as shown in Fig. 1 gear 60 is in mesh with the rack teeth 61 and the engagement of the spring pressed ball in the groove prevents accidental movement of the gear out of such mesh. When the shaft 58 and the gear are shifted to the left in said figure—to place the gear in the space 62—the ball enters the groove 65 and yieldingly retains the parts in such position against casual displacement.

Having thus set forth the nature of my invention, what I claim is:

1. In a machine of the character described, a base, means supporting a vertical spindle above said base, a tool holder on the lower end of said spindle, means for rotating said spindle and thus any tool in said holder, a work supporting platform on said base below said spindle, a rack bar connected with said platform and depending therefrom, a shaft mounted by said base, a lever for turning said shaft, a gear on said shaft, and said shaft manually shiftable to and from a position meshing said gear with the teeth of said rack bar whereby on operation of said lever the shaft may be turned to raise the platform toward the lower end of the spindle and whereby the position of the lever may be adjusted relative to the platform.

2. In a machine of the character described, a base, means supporting a vertically disposed spindle above the base, a tool holder on the lower end of said spindle, means for rotating said spindle and thus any tool in said holder, a work supporting platform on said base, a bar depending from the lower side of said platform and slidable through the base, a link pivotally connected with the lower end of said bar, means pivoting said link intermediate its ends to the base, a rod connected with the other end of the link and adapted for connection with a treadle for movement of the platform toward and from the lower end of the spindle, rack teeth on said bar, a shaft mounted on the base, a gear on said shaft, a hand lever connected with the shaft for imparting turning movements thereto, said shaft longitudinally movable relative to said bar to move the gear into and out of mesh with the teeth of said rack whereby said platform may be raised and lowered by operation of said hand lever when the gear is meshing with the teeth of the rack and by said rod when the gear is out of mesh with the rack teeth, and adjustable means disposed in the path of movement of said link for positively limiting movement of the platform by either the hand lever or the rod.

3. In a machine of the character described, a shelf-like support, a motor on the upper side of said support, a vertical spindle passing through said support, means mounting said spindle for limited vertical movement relative to the support, a friction cone gear on said spindle at the upper side of said support, a second friction cone gear, means mounting said second cone gear on the shaft of said motor for rotation therewith and for movement longitudinally thereof, an externally threaded sleeve-like extension on the rear side of said second cone gear, a collar threaded on said extension, a collar fixed to said motor shaft inwardly of said extension, a coil spring surrounding the shaft and extension between said collars and bearing against each of them and adapted to resiliently maintain said second cone gear in engagement with the one on the spindle when the latter is disposed for such engagement, and said first collar adjustable on the threads of said extension to vary the pressure on said spring whereby the pressure at which the second cone gear will yield and discontinue driving of the spindle mounted cone gear may be adjusted.

4. In a machine of the class described, a base, an upright on said base, a shelf-like support, means mounting said support on said upright for vertical adjustment thereon, a motor on the upper side of said support, a vertical spindle passing through said support, a tool holder mounted on the lower end of said spindle, means mounting said spindle for limited vertical movement relative to the support, a friction cone gear on said spindle at the upper side of said support, a second friction cone gear, means mounting said second friction cone gear on the shaft of the motor for rotation therewith and for movement longitudinally thereof, an externally threaded sleeve-like extension on the rear side of said second cone gear, a collar threaded on said extension, a collar fixed to said motor shaft inwardly of said extension, a coil spring surrounding the shaft and extension between said collars and bearing against each of them and adapted to resiliently maintain said second cone gear in engagement with the first cone gear when the spindle is disposed for such engagement, said first collar adjustable on the threads of said extension to vary the pressure on said spring whereby the pressure at which the second gear will yield and discontinue driving of the spindle mounted cone gear may be adjusted, a platform on said base below said spindle, and means for moving said platform toward and from the lower end of the spindle to move work toward and from said tool holder.

5. In a machine of the character described, a shelf-like support, a motor on the upper side of said support, a vertical spindle passing through said support, means mounting said spindle for limited vertical movement relative to the support, a gear on said spindle at the upper side of the support, a second gear, means mounting said second gear on the shaft of said motor for rotation therewith and for movement longitudinally thereof, adjustable resilient means controlling such movement of said second gear longitudinally of the motor shaft, said second gear normally disposed for engagement with the spindle mounted gear on movement of said spindle to bring the gears together, and said resilient means adapted to permit of the second gear moving in a direction away from the spindle mounted gear to ease such engagement and permit of slipping of the second gear on the spindle mounted gear on the pressure of the spindle mounted gear against the said second gear becoming excessive.

6. In a machine of the class described, a base, an upright on the base, a shelf-like support, means mounting said support on said upright for vertical adjustment thereon, a motor on the support, a vertical spindle mounted by the support, a tool holder on the lower end of said spindle, means mounting said spindle for limited vertical movement relative to the support, a gear on said spindle, a second gear, means mounting the second gear on the shaft of the motor for rotation therewith and for movement longitudinally thereof, adjustable resilient means controlling such movement of said second gear longitudinally of the motor shaft, said second gear normally disposed for engagement with the spindle mounted gear on movement of the spindle to bring the gears together, said resilient means adapted to permit of the second gear moving in a direction away from the spindle mounted gear to ease such engagement and permit of slipping of the second gear on the spindle mounted gear on the pressure of the spindle mounted gear against the second gear becoming excessive, a work platform on said base below said spindle, and means for moving said platform toward and from the lower end of the spindle to move work toward and from said tool holder.

ERIC V. HAFFLING.